L. P. HYNES.
AUTOMATIC ELECTRIC HEATING SYSTEM FOR RAILROAD CARS AND THE LIKE.
APPLICATION FILED NOV. 7, 1913.
1,146,879.
Patented July 20, 1915.
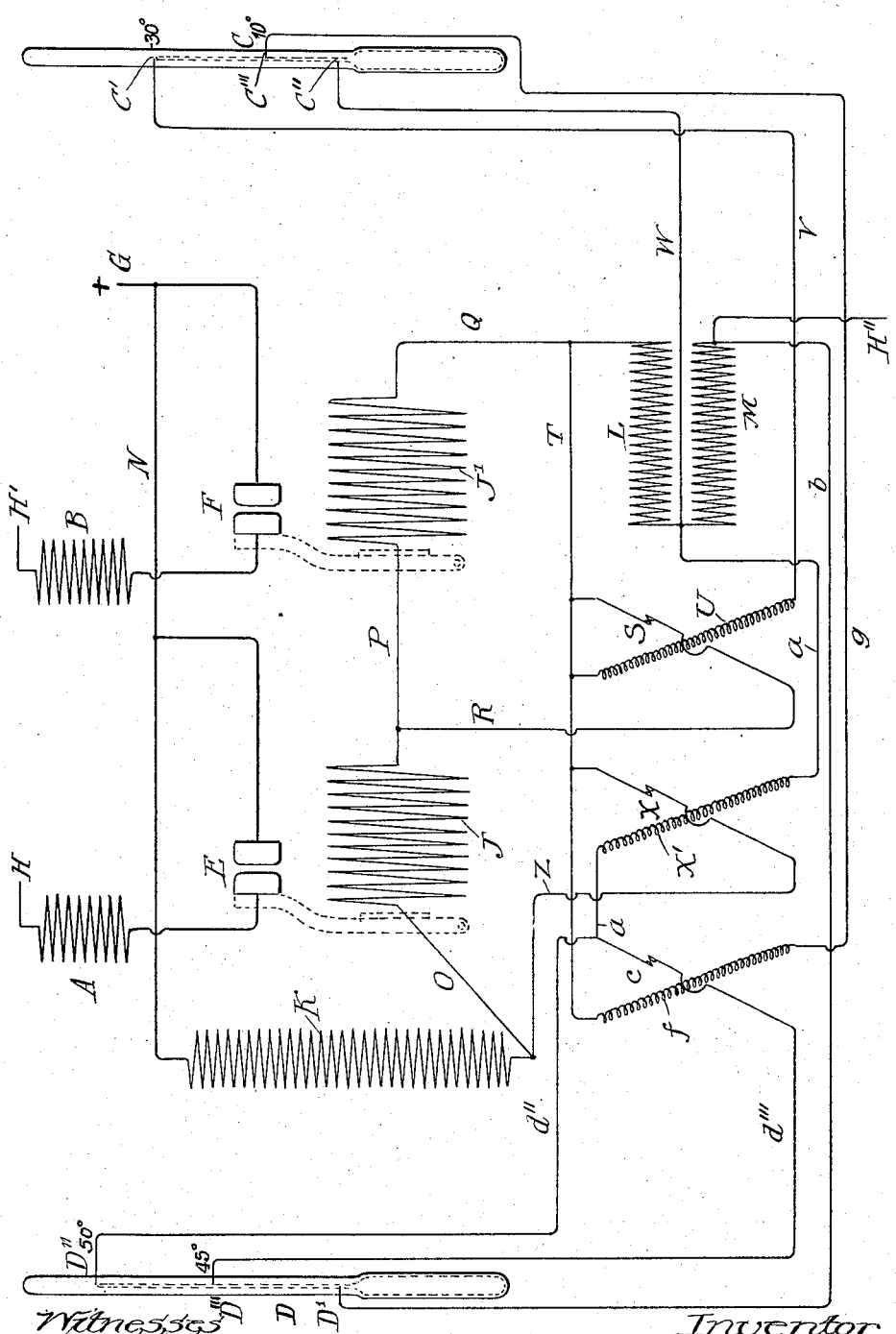

UNITED STATES PATENT OFFICE.

LEE P. HYNES, OF CHICAGO, ILLINOIS, ASSIGNOR TO RAILWAY UTILITY COMPANY, OF CHICAGO, ILLINOIS, A CORPORATION OF ILLINOIS.

AUTOMATIC ELECTRIC-HEATING SYSTEM FOR RAILROAD-CARS AND THE LIKE.

1,146,879.        Specification of Letters Patent.      Patented July 20, 1915.

Application filed November 7, 1913. Serial No. 799,707.

*To all whom it may concern:*

Be it known that I, LEE P. HYNES, a citizen of the United States, residing at Chicago, in the county of Cook and State of Illinois, have invented certain new and useful Improvements in Automatic Electric-Heating Systems for Railroad-Cars and the like, of which the following is a specification.

My invention relates particularly to that class of electric heating systems in which the heating current is controlled by means of thermostats.

It is desirable to maintain the interior of a car or other compartment at a constant temperature notwithstanding any changes which may occur in outside atmospheric conditions. But it is recognized that it is difficult, if not impossible, to maintain an even uniform temperature within a car during moderate weather by employing the same heating capacity as is necessary during very cold weather, for the reason that with the same delicacy of thermostatic control a heating plant of large capacity will cause much greater fluctuations of temperature in a compartment than will a heating plant of small capacity. Moreover, the working losses due to cutting in and out the heating coils are much greater when the heating capacity in use is large. Furthermore, where the temperature of a car must be kept at substantially the same point in moderate weather and at extremely low atmospheric temperatures, a generating plant is required of a capacity greatly in excess of that necessary to maintain the required temperature under ordinary atmospheric conditions, not only by reason of the amount of heat or number of heat units which are required at such low temperatures to maintain the normal temperature of the car or other compartment, but also because in extremely cold weather the load upon the generators is excessive by reason of the increase in the burden from sources other than the heating. To use the technical expression the "peak of the load" is extremely high compared to the average load. These conditions are recognized in the municipal regulations governing street car service in many towns and cities and the temperature thereby required to be maintained within the car is materially less in extremely cold weather than when the temperatures are somewhat higher.

It is the object of my invention to provide an economical system of working, taking advantage of the above conditions to reduce the current consumption by proper automatic control of the same. With this object in view I provide a thermostatically controlled system in which, when the outside temperature is above a certain predetermined point a portion of the heaters comprised in the system are cut out so that the temperature is maintained by those left in circuit and the inside temperature of the car is maintained at one or the other of two selected temperatures accordingly as the outside temperature is above or below a certain point.

In the accompanying drawing I have shown in diagram a preferred arrangement of apparatus by which my invention is carried out but it will be understood that the specific disclosure is for the purpose of exemplification only and that the scope of the invention is defined in the following claims in which I have endeavored to distinguish it from the prior art so far as known to me without, however, relinquishing or abandoning any portion or feature thereof.

I have deemed it unnecessary to show or describe the specific construction of the various pieces of apparatus, relays, contactors and the like, included in my system for the reason that they are or may be of any well-known or approved design and therefore merely symbolic representation of the same is sufficient.

I have shown the heaters as two in number lettered respectively A and B, the former of which is always in circuit whenever heat is required and the latter whenever the temperature falls below the predetermined point referred to above. The point at which heater B is cut in and out is determined by a thermometer C which is arranged at some convenient point on the outside of the car or other compartment whose temperature is to be controlled. A second thermometer D is arranged within the car and controls the degree of inside temperature at which the heating system as a whole whether involving heater A alone or heaters A and B jointly, is cut in and out. As shown the thermometer D is arranged to maintain the temperature in the car at either of two predetermined points accordingly as the outside temperature is above or below a certain other predetermined point, the temperature selected in the present instance being shown as 45 and 50 degrees Fahrenheit, respectively. The outside thermometer C, above mentioned, determines which of these two temperatures is to be maintained and as shown in the drawing is arranged to cause an inside temperature of 50 degrees to be maintained whenever the outside temperature is above 10 degrees Fahrenheit and an inside temperature of 45 degrees when the atmospheric temperature falls below that point. Thus the outside thermometer has two distinct but related functions controlling both the point at which the second heater is thrown in and out of circuit and the point at which the inside temperature is maintained. The contactor or other switch by which the heater A is controlled is shown at E and a second contactor or switch F controls the circuit through the heater B, the circuits of the respective heaters being parallel and connected to service at G and to the ground at H, H' respectively. The electromagnetic coils for controlling the contactors E, F are shown at J, J', respectively, and are in series with each other and with a heavy resistance K as well as with a pair of lesser resistances L, M, the circuit when both of the heaters are active being from service at G through wire N, resistance K, conductor O, coil J, conductor P, coil J', conductor Q, coil L, coil M and so to ground at H''.

The construction of the contactors E, F and their actuating coils J, J' is such that whenever a current flows through the circuit just traced the contactors will both be closed and current will flow through the heaters. The resistance K is so chosen that the controlling current through this circuit is but a very small fraction of the current through the heaters, being just sufficient to operate the apparatus.

When the outside temperature rises above a predetermined point the heater B is cut out by short-circuiting the controlling coil J' of its contactor. This is accomplished through shunt connections from the conductor P to the conductor Q comprising the conductor R, the contacts of the relay switch S and conductor T. As the resistance of this path is negligible when compared to that of the coil J', whenever it is closed through switch S the current flowing through coil J' is insufficient to maintain the contactor F closed so current through heater B is cut out. Switch S is normally open and may be in the nature of an ordinary relay, the coil U of which is included in a shunt circuit about the resistance L, said circuit comprising the conductor T, above mentioned, said coil, conductor V, contact C' of the thermometer thermostat C, contact C'' thereof and conductor W. Whenever the temperature outside the car reaches the point at which the contact C' is closed, shown in this instance as 30 degrees, the shunt circuit just described is closed and a current passes through the coil U closing the normally open contacts of the switch S and thereby shunting the current about the contactor coil J' which, as stated above, thereupon opens the circuit through the heater B.

The current through the heating coil or coils, whether one or both is in operation by reason of the control heretofore described, is controlled by the thermostat D to maintain the temperature uniform, as stated above. The contacts of a relay X are included in a shunt about the coils J, J' of the contactors, said shunt including the conductor Z, said contacts and conductor T heretofore mentioned. Whenever the circuit through this shunt is closed it affords a path of substantially no resistance around the coils J, J' which are therefore deënergized causing the contactors E, F to open the heating circuit or circuits accordingly as one or both of the heaters A, B is in circuit. The coil X' of relay X and thermostat D are included in a circuit in shunt to the resistance M comprising also conductor $a$ which is connected to one terminal of coil M, and conductor $b$ by which the other terminal of coil M is connected to the permanently closed contact D' of the thermostat D. Both contacts D'', D''' of thermostat D are connected by conductors $d''$, $d'''$ respectively to the other terminal $a'$ of the coil X'. When the circuit is closed through either of contacts D'', D''' the relay X closes the shunt around coils J, J', which shunt by substantially diverting the current therefrom opens the contactors of the heating circuits. Whenever the connection of contact D''' to the relay is complete the heating circuits will of course be cut out as soon as the mercury column of the thermostat D reaches the lower contact D''', which will therefore control the temperature. The branch conductor $d'''$, however, is broken whenever the outside temperature is above a predetermined point. For this purpose the branch conductor $d'''$ includes contacts $e$ of a relay which are normally closed. Provision is made, however, for opening the contacts $e$ whenever the outside temperature is above said predetermined point and thereby cutting out the contact D''' and permitting the contact D'' to control. For this purpose the outside thermostat is provided with a contact C''' at a predetermined point shown in the drawing as coincident with the 10 degree mark which contact is in circuit with coil $f$ controlling the contacts $e$, the circuit being arranged in shunt to the resistance L and being traced as follows: from the conductor Q connected to one terminal of coil L, through conductor T, coil *f*, conductor *g*, contact C''', the column of mercury, contact C'' and conductor W, before mentioned, to the other terminal of coil L. When the mercury in the thermostat is above the terminal C''' the coil *f* is energized to open the contacts *e* and throw the thermostat D''' out of circuit rendering it inoperative so that the higher contact D'' controls the temperature of the car.

It will thus be seen that by the use of the two thermometer thermostats in the system just described great flexibility is obtained, the temperature maintained at a higher or lower degree within the car accordingly as the outside temperature is higher or lower and one or both of the heaters employed put in action depending upon whether the outside temperature is above or below another predetermined point. By properly determining the resistance of the coils L and M the strength of current passing through the respective shunts, relays and thermostats may be so adjusted as to properly actuate the relays without being sufficient to injure the thermostats.

I claim:

1. In a heating system, a heater, a thermostat controlling the same and adapted to cut the heater out at either of two temperatures accordingly as the thermostat is set, and a second thermostat adapted and arranged to set the first thermostat for either temperature accordingly as the surrounding temperature is above or below a certain predetermined point.

2. In a heating system, a heater, an electromagnetic device for controlling the heater comprising a thermostat having two contacts adapted to be closed at lower and higher temperatures respectively, a circuit including said electromagnetic device and a source of electrical energy, means for controlling the flow of current through the coil of said device comprising parallel circuits through said contacts respectively and a thermostatic device controlling the circuit of the contact corresponding to the lower temperature.

3. In an electric heating system, a heating device, a contactor for opening and closing the circuit of the same, a controlling circuit comprising suitable resistance, a coil in said controlling circuit for operating said contactor, an electromagnetic switch controlling the current through said coil, a shunt around a part of the resistance of said controlling circuit comprising the coil of said switch and a thermostat in said shunt controlling the current therethrough.

4. In an electric heating system, a heating circuit, a contactor for opening and closing the same, the controlling circuit comprising a suitable resistance, an electromagnetic device in said controlling circuit for operating the contactor, an electromagnetic switch controlling the current through said device, a thermostat having two contacts adapted to be closed respectively at a higher and a lower temperature, a shunt about a portion of the resistance of said controlling circuit and including the coil of the electromagnetic switch, said shunt circuit being split to include said thermostat contacts in parallel, an electromagnetic switch, the contacts of which are in circuit with said thermostat contact of lower temperature and a second thermostat in circuit with a source of electrical energy and with the coils of the second said switch and adapted to open the switch when the temperature reaches a predetermined point.

5. In an electric heating system, a heating circuit, a controlling circuit in shunt to said heating circuit comprising a suitable resistance, a contactor for closing the heating circuit, an electromagnetic coil in said controlling circuit for operating said contactor, a shunt circuit about said contactor coil including a pair of contacts, an electromagnetic coil controlling said contacts, a second resistance in said control circuit, and a thermostat, said thermostat and relay coil being in shunt to said contactor operating coil.

6. In an electric heating system for electrically propelled cars and the like, a heating coil, an electromagnetic circuit closer for controlling the circuit through the same, a main controller circuit comprising the coil of said electromagnetic circuit closer and a resistance, a shunt circuit about said circuit closer coil, an electromagnet relay controlling said shunt circuit, a second shunt circuit about said resistance including the coil of said relay, a thermostat having two contacts operative at different temperatures both of which are normally in circuit with said relay coil, and temperature controlled means for throwing one of said contacts out of circuit.

7. In an electric heating system for electrically propelled cars and the like, a heating coil, an electromagnetic circuit closer for controlling the circuit through the same, a main controlled circuit comprising the coil of said electromagnetic circuit closer and a resistance, a shunt circuit about said circuit closer coil, a relay controlling said shunt circuit, a second shunt circuit about said resistance including the coil of said relay, a thermostat having two contacts operative at different temperatures both of which are normally in circuit with said relay coil, branch circuits, one including the contact operative at the lower temperature, a relay in the latter circuit, and a second thermostat included in circuit with the coil of the relay.

8. In an electric heating system for electrically-propelled cars and the like, a plurality of heaters, an electromagnetic contactor the contacts of which are in circuit with one or more of said heaters, a second electromagnetic contactor the contacts of which are in circuit with one or more of said other heaters the main controlling circuit comprising the coils of said contactors and a resistance, an electromagnetic switch controlling the circuit through the coil of one of said electromagnetic contactors, a thermostat adapted to make and break a circuit and a circuit including a source of electrical energy, said thermostat and the coil of said electromagnetic switch.

9. In an electric heating system for electrically propelled cars and the like, a plurality of heaters, an electromagnetic contactor the contacts of which are in circuit with some of said heaters, a second electromagnetic contactor the contacts of which are in circuit with other of said heaters, a main controlling circuit comprising the coils of said contactors and a resistance coil, a shunt circuit about the coil of one of said contactors, a relay controlling said shunt circuit, a second shunt circuit about the resistance coil including the coil of said relay and a thermostat in the second said shunt circuit controlling current through said relay coil.

10. In an electric heating system for cars and the like, a series of heating coils, an electromagnetic contactor controlling the same, a second series of heating coils and an electromagnetic contactor controlling the same, a main controlling circuit including the coils of said electromagnetic contactors and two resistance coils, a shunt about the coils of said contactors, an electromagnet relay controlling said shunt circuit, a shunt circuit about one of the resistance coils including the coil of said relay, a thermostat controlling the latter shunt circuit, a shunt about the coil of one of the contactors, a relay controlling the same, a shunt circuit about the other of said resistance coils comprising the coil of the last named relay, and a thermostat controlling the last said shunt circuit.

11. In an electric heating system for electrically-propelled cars and the like, a pair of heating circuits A, B, contactors E, F for controlling said circuits, a controller circuit comprising resistance, electromagnetic coils J J' for controlling the respective contactors, an electromagnetic switch X for controlling the flow of current through said coils J J', a circuit including a portion of the resistance of the main controlling circuit and the coil of said electromagnetic switch, a thermostat included in said circuit and adapted to operate the switch when the temperature reaches a predetermined degree, a second electromagnetic switch controlling the flow of current through one of the contactor coils only, a further circuit including a source of electrical energy and the coil of said second electromagnetic switch and a thermostat included in the last said circuit and adapted to open the same when the temperature reaches a predetermined degree.

12. In an electric heating system for electrically-propelled cars and the like, electric heaters A, B, contactors E, F for the respective heaters, a main control circuit in shunt to said heaters comprising a resistance K, electromagnetic coils J J' adapted and arranged to operate the respective contactors, a further resistance in said main controller circuit, an electromagnetic switch S adapted and connected to control the passage of current through the coil J', an auxiliary circuit including the coil U of said electromagnetic switch and the resistance L, a thermostat C arranged in said auxiliary circuit and adapted to close the same when the temperature reaches a certain predetermined degree, a second electromagnetic switch X adapted and connected to control the circuit through both said coils J J', the coil X' of said second switch being included in a circuit in shunt to a portion of the resistance of the main controlling circuit, a second thermostat D having the permanent contact D' and the variable contacts D'' and D''', contact D'' being in permanent circuit with coil X' and the contact D''' being likewise in circuit with said coil, an electromagnetic switch e interposed between said contact D''' and the coil X', the coil f of said electromagnetic switch being connected in circuit with a portion of the resistance of the main controlling circuit and with the thermostat C whereby when the temperature reaches a predetermined degree the contact D''' is cut off from coil X'.

LEE P. HYNES.

Witnesses:
JOHN MACAULEY,
ROBERT DOBBERMAN.

Copies of this patent may be obtained for five cents each, by addressing the "Commissioner of Patents, Washington, D. C."